United States Patent
Hook et al.

(10) Patent No.: US 10,042,988 B2
(45) Date of Patent: Aug. 7, 2018

(54) TIERED CODE OBFUSCATION IN A DEVELOPMENT ENVIRONMENT

(71) Applicant: INTERNATIONAL BUSINESS MACHINES CORPORATION, Armonk, NY (US)

(72) Inventors: James K. Hook, Eastleigh (GB); Hamish C. Hunt, Ashford (GB); Nicholas K. Lincoln, Middle Wallop (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/671,676

(22) Filed: Aug. 8, 2017

(65) Prior Publication Data

US 2017/0337359 A1 Nov. 23, 2017

Related U.S. Application Data

(63) Continuation of application No. 15/085,070, filed on Mar. 30, 2016.

(51) Int. Cl.
| | |
|---|---|
| *G06F 11/30* | (2006.01) |
| *G06F 12/14* | (2006.01) |
| *G06F 21/14* | (2013.01) |
| *G06F 21/31* | (2013.01) |
| *G06F 21/57* | (2013.01) |

(Continued)

(52) U.S. Cl.
CPC .............. *G06F 21/14* (2013.01); *G06F 21/31* (2013.01); *G06F 21/57* (2013.01); *G06F 21/84* (2013.01); *H04L 63/08* (2013.01); *G06F 3/011* (2013.01)

(58) Field of Classification Search
None
See application file for complete search history.

(56) References Cited

U.S. PATENT DOCUMENTS

| 6,978,367 B1 | 12/2005 | Hind et al. |
| 8,430,310 B1 | 4/2013 | Ho et al. |

(Continued)

FOREIGN PATENT DOCUMENTS

WO 2016074802 A1 5/2016

OTHER PUBLICATIONS

Durbin, "Real-Time Coding in VR Is Possible With 'RiftSketch' From AltspaceVR Dev," Feb. 12, 2016. [Online]. Available: https://uploadvr.com/riftsketch/.*

(Continued)

*Primary Examiner* — Christopher Revak
*Assistant Examiner* — Vadim Savenkov
(74) *Attorney, Agent, or Firm* — Christopher M. Coy

(57) ABSTRACT

A method for viewing a plurality of encrypted code displayed within an integrated development environment with a pair of augmented reality (AR) glasses. A plurality of user login credentials submitted by a user utilizing the pair of AR glasses to access a plurality of encrypted code. The method may determine the user is authorized to access a portion of the plurality of encrypted code based on the received plurality of user login credentials. The method may further decrypt the portion based on determining the user is authorized to access the portion. The method may further include displaying the decrypted portion on a lens within the pair of AR glasses.

1 Claim, 6 Drawing Sheets

(51) Int. Cl.
  *G06F 21/84* (2013.01)
  *H04L 29/06* (2006.01)
  *G06F 3/01* (2006.01)

(56) References Cited

U.S. PATENT DOCUMENTS

| | | | |
|---|---|---|---|
| 8,689,352 | B2 | 4/2014 | Schaad et al. |
| 8,886,942 | B2 | 11/2014 | Forte et al. |
| 9,137,232 | B2 | 9/2015 | Eschbach et al. |
| 9,767,585 | B1* | 9/2017 | Carter, Jr. ............... G06T 11/60 |
| 2007/0247392 | A1* | 10/2007 | Littrell .................... G09G 5/00 345/8 |
| 2009/0025063 | A1* | 1/2009 | Thomas .............. G06F 21/6218 726/4 |
| 2010/0164990 | A1* | 7/2010 | Van Doorn .......... G02B 27/017 345/633 |
| 2013/0272523 | A1 | 10/2013 | McCorkindale et al. |
| 2014/0164772 | A1 | 6/2014 | Forte et al. |
| 2014/0173759 | A1 | 6/2014 | Essary et al. |
| 2014/0282911 | A1 | 9/2014 | Bare et al. |
| 2015/0016602 | A1 | 1/2015 | de los Reyes et al. |
| 2015/0310188 | A1* | 10/2015 | Ford ....................... G06F 21/10 726/28 |
| 2016/0035233 | A1* | 2/2016 | Breed ..................... G09B 7/00 345/8 |
| 2017/0091490 | A1* | 3/2017 | Cameron ................ G06F 21/84 |
| 2017/0099297 | A1* | 4/2017 | Armer ................... H04L 63/105 |
| 2017/0103192 | A1* | 4/2017 | Hussey ................... G06F 8/30 |
| 2017/0193839 | A1* | 7/2017 | Breed ..................... G09B 7/077 |
| 2017/0286650 | A1 | 10/2017 | Hook et al. |

OTHER PUBLICATIONS

Elliott, "Using Virtual Reality to Create Software : A Likely Future," Jan. 15, 2015. [Online]. Available: https://medium.com/@anthonyE_vr/using-virtual-reality-to-create-software-a-likely-future-9c4472108289.*

Forte et al., "EyeDecrypt—Private Interactions in Plain Sight" IACR Cryptology ePrint Archive, 2013, p. 1-18, International Association for Cryptologic Research (IACR).

Keyscrambler, "Secure Your Keystrokes Deep Through Windows OS," How KeyScrambler Works, p. 1-2, QFX Software Corporation, https://www.qfxsoftware.com/ks-windows/how-it-works.htm, Accessed on Mar. 23, 2016.

Mell et al., "The Nist Definition of Cloud Computing," National Institute of Standards and Technology, Sep. 2011, p. 1-3, Special Publication 800-145.

Hook et al., "Tiered Code Obfuscation in a Development Environment," U.S. Appl. No. 15/085,070, filed Mar. 30, 2016.

List of IBM Patents or Patent Applications Treated as Related, Aug. 7, 2017, 2 pgs.

* cited by examiner

TIERED CODE OBFUSCATION IN A DEVELOPMENT ENVIRONMENT

BACKGROUND

The present invention relates generally to the field of computing, and more particularly to information security.

In software development, obfuscation may be an act of obscuring code or making the code difficult to understand (e.g., encrypting the code). Obfuscating code may be similar to encrypting natural language or human speech. Software programs may be designed to obfuscate code to conceal the purpose or logic of the code in order to prevent tampering or deter reverse engineering.

SUMMARY

According to one exemplary embodiment, a method for viewing a plurality of encrypted code displayed within an integrated development environment with a pair of augmented reality (AR) glasses is provided. The method may include receiving a plurality of user login credentials submitted by a user utilizing the pair of AR glasses to access a plurality of encrypted code. The method may further include determining the user is authorized to access a portion of the plurality of encrypted code based on the received plurality of user login credentials. The method may further include decrypting the portion based on determining the user is authorized to access the portion. The method may further include displaying the decrypted portion on a lens within the pair of AR glasses.

According to another exemplary embodiment, a computer system for viewing a plurality of encrypted code displayed within an integrated development environment with a pair of AR glasses is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of user login credentials submitted by a user utilizing the pair of AR glasses to access a plurality of encrypted code. The method may further include determining the user is authorized to access a portion of the plurality of encrypted code based on the received plurality of user login credentials. The method may further include decrypting the portion based on determining the user is authorized to access the portion. The method may further include displaying the decrypted portion on a lens within the pair of AR glasses.

According to yet another exemplary embodiment, a computer program product for viewing a plurality of encrypted code displayed within an integrated development environment with a pair of AR glasses is provided. The computer program product may include one or more computer-readable storage devices and program instructions stored on at least one of the one or more tangible storage devices, the program instructions executable by a processor. The computer program product may include program instructions to receive a plurality of user login credentials submitted by a user utilizing the pair of AR glasses to access a plurality of encrypted code. The computer program product may further include program instructions to determine the user is authorized to access a portion of the plurality of encrypted code based on the received plurality user login credentials. The computer program product may further include program instructions to decrypt the portion based on determining the user is authorized to access the portion. The computer program product may further include program instructions to display the decrypted portion on a lens within the pair of AR glasses.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
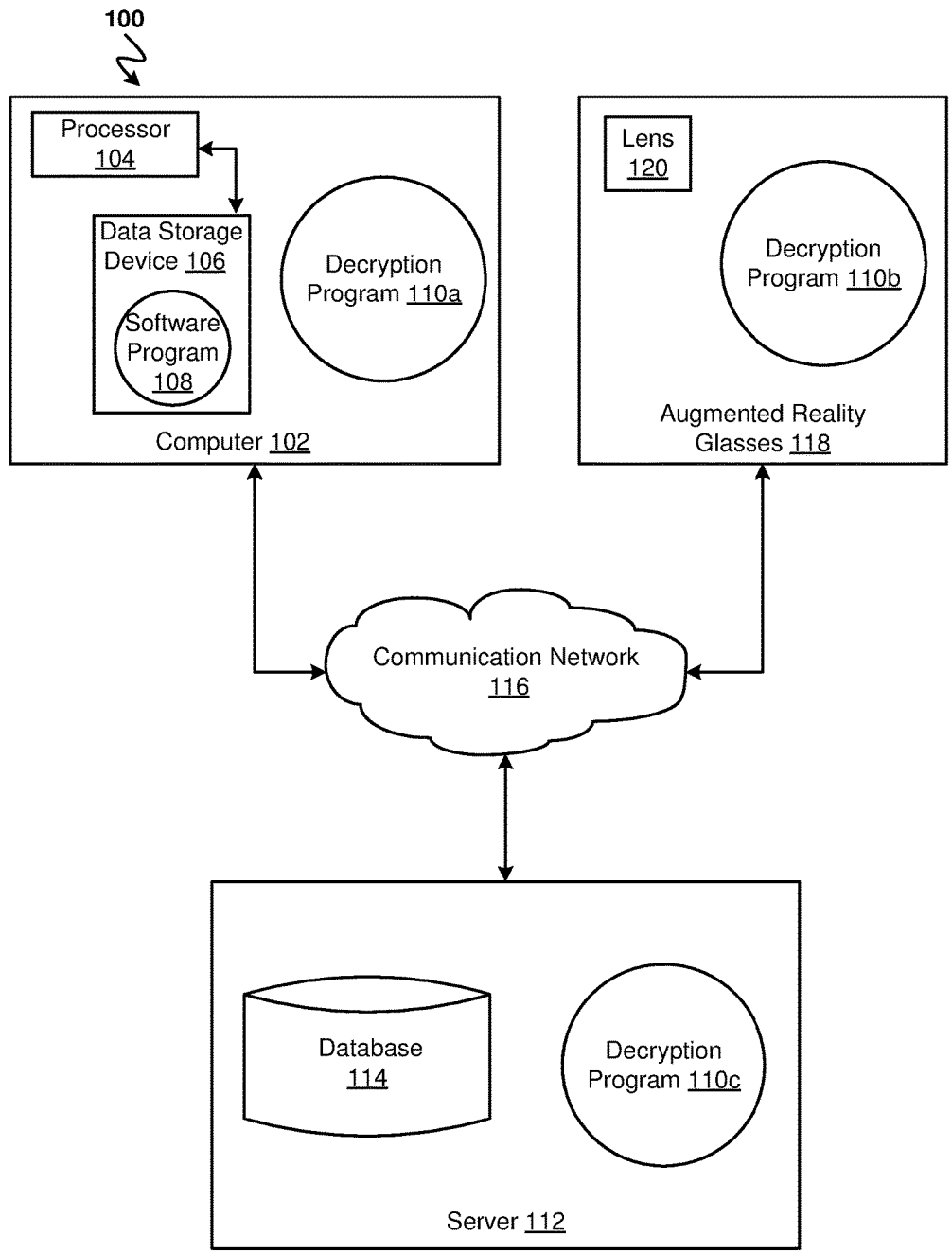
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A current security concern in commercial software is to increase the likelihood that developers only view intellectual property (e.g., proprietary code) that the developer is authorized to view. This security concern may be addressed by restricting access (i.e., editing and viewing) to certain code only to authorized developers. Restricting code access to authorized developers may be cumbersome when products are built on open source code or a business partner's software. A possible security concern to resolve proprietary code being viewed by unauthorized developers may be to distinguish proprietary code from source code according to authorization levels, particularly for developers new to a project who have little knowledge of what code may be acceptable to view without authorization. Currently, known methods for protecting proprietary code may include restricting code by forewarning developers about particular code.

Developers may work with source code repositories, which may require storing both source code and proprietary code. Furthermore, source code repositories may introduce risk of unauthorized developers accessing proprietary code during large scale projects. Another example scenario which may introduce risk of unauthorized developers accessing proprietary code may include undefined areas within code where certain packages or classes contain trivially derivative works of open source projects mixed with proprietary code that requires editing. Furthermore, forewarning developers about which source code the developers may have access to view and/or edit may not be possible when source code access authorization may rapidly change. For example, when variables being used in an open source project need quick analysis for problem resolution, rapid changes in the authorization of source code access may be mitigated.

Administrators may mitigate rapid changes in the authorization levels of source code by enabling assignment of various roles and responsibilities to different people (e.g., developer, stakeholder etc.), thereby reducing unauthorized developers from downloading or editing restricted code. However, assignment of various roles and responsibilities may not solve the problem of unauthorized developers viewing code over-the-shoulder or through paired programming as well as failing to allow for fast responses to changes in circumstances, such as emergency fixes of the code. Furthermore, assignment of various roles and responsibilities may not organize the code into one or more authorization levels, which may be referred to as code authorization levels.

Therefore, it may be advantageous to, among other things, provide a way to obscure code by encrypting the code according to one or more user authorizations levels that may be decrypted with AR glasses.

The following described exemplary embodiments provide a system, method, and program product for decrypting source code including one or more source code authorization levels with AR glasses. As such, the present embodiment has the capacity to improve the technical field of information security by restricting access of proprietary code from unauthorized developers. More specifically, the present embodiment has the capacity of encrypting source code with an integrated development environment (IDE) that may only be viewable to authorized developers viewing the encrypted source code through AR glasses designed to decrypt code in real time up to a predefined (e.g., defined by an administrator) authorization level.

Encoding source code in a source control system, such that the source code may only be read through a particular IDE and with a set of AR glasses that can be designed to encode such source code, is provided. Encoding the source code can be achieved by organizing the source code into one or more source code authorization levels and utilizing AR glasses designed to decrypt portions of the source code according to a predefined (e.g., user defined) source code authorization level. Developers using AR glasses configured to decrypt code can view source code that the developer has authorization to access. Unauthorized personnel may not view source code that is above their authorization level. Certain authorized administrators may determine authorization levels for particular portions of source code and proprietary code. Certain authorized administrators may be permitted to modify the authorization level(s) accessible to a developer and the current source code authorization level. For example, an authorized administrator may change a developer authorization level from level four to level six and the code authorization level from level five to level seven by inputting both the developer authorization levels and the code authorization levels into a decryption program, as will be discussed in further detail below. The code authorization level may also be modified by developers after creating code. The authorization level may be based on a predefined scale (e.g., authorization level one through authorization level ten).

Modifying source code authorization levels can be utilized when developers are modifying or creating the source code (e.g., during projects). For example, the developer or authorized administrator may change source code currently from an authorization level one to an authorization level two, or vice versa, by updating authorization levels in the decryption program. A developer may request an authorization level change from an authorized administrator. Additionally, the source code may only be edited by developers with an authorization level at or above the code authorization level. Furthermore, the IDE may restrict unauthorized developers from editing source code.

Encrypted source code may be downloaded and viewed by authorized personnel wearing AR glasses. Furthermore, decrypting source code with AR glasses may prevent unauthorized users from viewing the source code on a computer monitor. The AR glasses may only decrypt source code within a certain predefined authorization level. For example, AR glasses may only be designed to decrypt source code with authorization up to authorization level three. Additionally, the authorization level for particular AR glasses may change with approval from authorized administrators. According to at least one embodiment, source code may be organized into a hierarchy of one or more source code authorization levels.

Referring to FIG. 1, an exemplary networked computer environment 100 in accordance with one embodiment is depicted. The networked computer environment 100 may include a computer 102 with a processor 104 and a data storage device 106 that is enabled to run a software program 108 (e.g. an IDE) and a decryption program 110a. Client computer 102 may be, for example, a mobile device, a telephone, a personal digital assistant, a netbook, a laptop computer, a tablet computer, a desktop computer, AR glasses 118, or any type of computing device capable of running a program, accessing a network, and accessing a database 114.

The AR glasses 118 may be a client computer (e.g., 102) and may also include substantially similar functionality as the client computer (e.g., 102). The AR glasses 118 may be capable of running a decryption program 110b. The client computer 102 and the AR glasses 118 may be communicatively coupled (e.g., wirelessly, by WIFI, by 4G, or electrically connected) via a communication network 116. The AR glasses 118 may be a user-wearable technology designed to decrypt code displayed within an IDE (not shown) up to a predefined authorization level. The AR glasses 118 may display the decrypted code on the lens 120 of the AR glasses 118 thereby allowing a user wearing the AR glasses 118 to observe and/or understand decrypted code while any other individual not wearing the AR glasses 118 observes the encrypted code. The networked computer environment 100 may also include a server 112 that is enabled to run a decryption program 110c that may interact with a database 114 and a communication network 116. The networked computer environment 100 may include a plurality of computers 102, AR glasses 118, and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 and the AR glasses 118 may communicate with the server computer 112 via the communication network 116. The communication network 116 may include connections, such as wire, wireless communication links, or fiber optic cables. As will be discussed with reference to FIG. 4, server computer 112 may include internal components 902a and external components 904a, respectively, and client computer 102 and AR glasses 118 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. According to various implementations of the present embodiment, the decryption program 110a-c may interact with a database 114 that may be embedded in various storage devices, such as, but not limited to, a computer/mobile device 102, AR glasses 118, a networked server 112, or a cloud storage service.

According to the present embodiment, a user using a client computer 102, AR glasses 118, or a server computer 112 may use the decryption program 110a, 110b, 110c (respectively) to verify user login credentials entered by a user and decrypt code up to a predefined authorization level that may be encrypted by an IDE. The code decryption process is explained in more detail below with respect to FIGS. 2 and 3.

Figure 2:
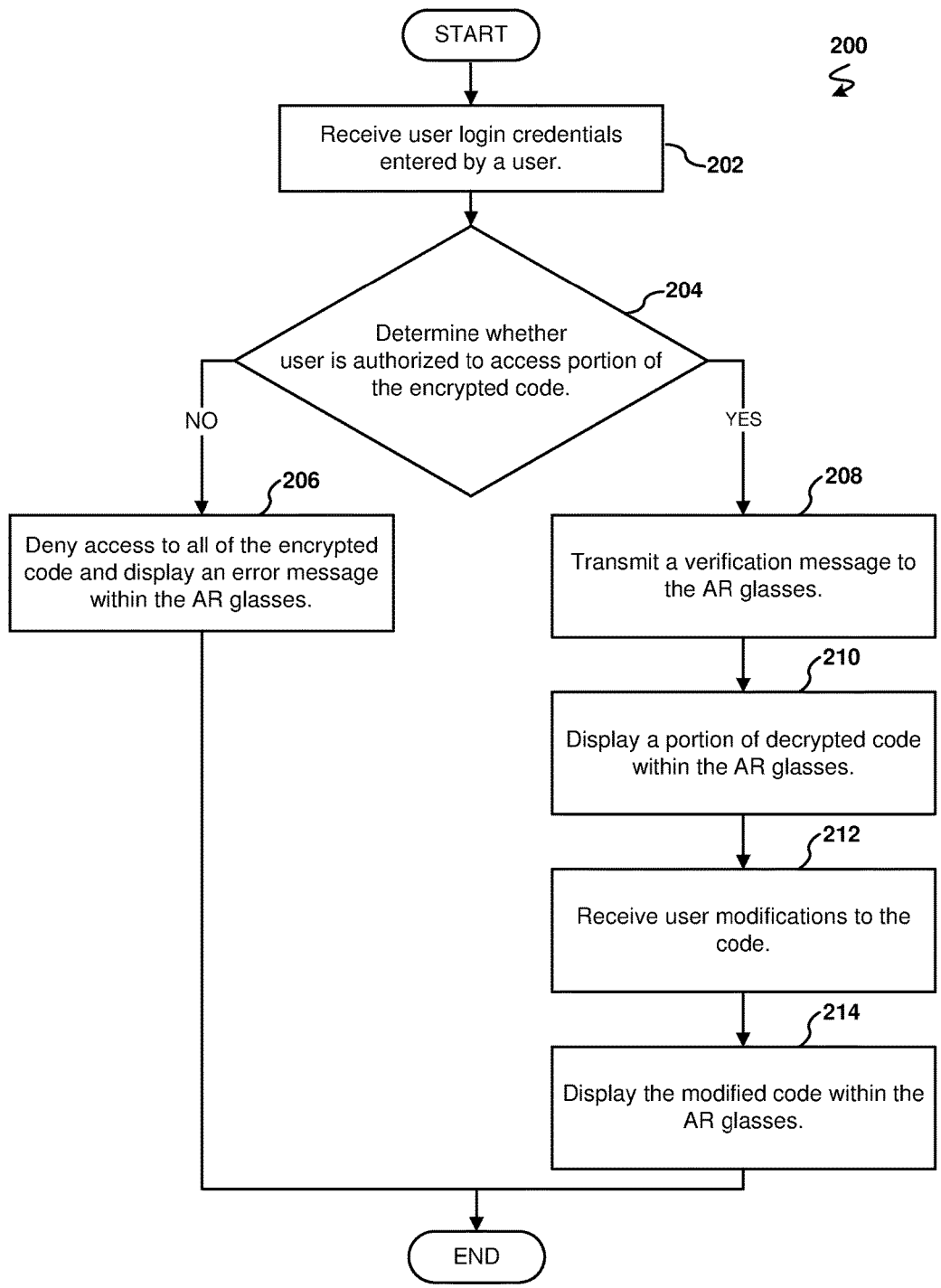
FIG. 2 an operational flowchart illustrating a code decryption process for visualizing encrypted code with augmented reality (AR) glasses according to at least one embodiment.

Referring now to FIG. 2, an operational flowchart illustrating a code decryption process 200 for visualizing encrypted code with AR glasses 118 (FIG. 1) according to at least one embodiment is depicted. At 202, the decryption program 110a-c (FIG. 1) receives user login credentials entered by a user. The user login credentials (e.g., user name and/or password) may be associated with an authorization level of code that the user has access to view and/or edit. The user may wear AR glasses 118 (FIG. 1) designed to decrypt and display portions of the code up to a predefined authorization level based on the received user login credentials. The AR glasses 118 (FIG. 1) may be capable of receiving the user login credentials submitted by a user through interactions (e.g., voice recognition, physical gestures, or textual input) with the AR glasses 118 (FIG. 1). In at least one other embodiment, the IDE may receive the user login credentials submitted by the user and transmit the received user login credentials to the AR glasses 118 (FIG. 1).

Then, at 204, the decryption program 110a-c (FIG. 1) determines whether the user is authorized to access a portion of the encrypted code. According to at least one embodiment, the code decryption process 200 may continue along the operational flowchart if the user login credentials are authorized to access at least a portion of the encrypted code. The decryption program 110a-c (FIG. 1) can verify whether the user has authorization to access at least a portion of encrypted code by searching the database 114 (FIG. 1) within the server 112 (FIG. 1) for the user login credentials. The database 114 (FIG. 1) may include a list of user login credentials and the user login credentials' associated user authorization levels. The decryption program 110a-c (FIG. 1) may identify the received user login credentials within the list and then determine the user authorization level associated with the user login credentials. The decryption program 110a-c (FIG. 1) may compare the user authorization level to the code authorization level within the code. If the decryption program 110a-c (FIG. 1) determines the user is authorized to access at least a portion of the encrypted code based on the user login credentials (step 204, "YES" branch), the code decryption process 200 may continue to transmit a verification message to the AR glasses 118 (FIG. 1) at step 208. For example, a user with a user authorization level (e.g., level five) may be compared to code authorization levels (e.g., level five) and the code with code authorization level five or lower within the code may be identified. Therefore, the user may be authorized to access at least a portion of the encrypted code based on the user login credentials. If decryption program 110a-c (FIG. 1) determines the user is not authorized to access at least a portion of the encrypted code based on the user login credentials (step 204, "NO" branch), the code decryption process 200 may continue to deny access to all of the encrypted code and display an error message within the AR glasses 118 (FIG. 1) at step 206.

If the decryption program 110a-c (FIG. 1) determined the user is not authorized, then at step 206 the decryption program 110a-c (FIG. 1) denies access to all of the encrypted code and displays an error message on the lens 120 (FIG. 1) within the AR glasses 118 (FIG. 1). If the user login credentials are not verified, a user viewing a monitor displaying the code through AR glasses 118 (FIG. 1) may view a black bar on the lens 120 (FIG. 1) covering all of the encrypted code as will be described with reference to FIG. 3. The black bar may be a visual indicator that the code being covered by the black bar is encrypted. Moreover, the black bar on the lens 120 (FIG. 1) may not be part of the encrypted code. Furthermore, the error message may display advice for the user to take in order to access the encrypted code. For example, the user could contact an administrator in order to gain access. Moreover, the decryption program 110a-c (FIG. 1) may prevent any editing of code by the user within the IDE.

However, if the decryption program 110a-c (FIG. 1) determines the user login credentials of the user are authorized to access at least a portion of the encrypted code, then the decryption program 110a-c (FIG. 1) transmits a verification message to the AR glasses 118 (FIG. 1) at step 208. Furthermore, the verification message may indicate which portions of the code the user may view and which portions of the code the user may edit. For example, the verification message may indicate the user has a user authorization level three and may view portions of the code with a code authorization level of four or below but only edit portions of the code with a code authorization level of three or below. Once the verification message is received, the AR glasses 118 (FIG. 1) may then display portions of the code that the user can access according to the user login credentials.

At 210, the decryption program 110a-c (FIG. 1) displays a portion of decrypted code within the AR glasses 118 (FIG. 1). The decrypted code may be displayed within a lens 120 (FIG. 1) of the AR glasses 118 (FIG. 1). Furthermore, the displayed decrypted code can be virtually attached to the IDE displayed on the screen of the client device 102 (FIG. 1) so that a user may visually see the decrypted code as if the decrypted code were solely displayed on the client device screen rather than on the lens 120 (FIG. 1) of the AR glasses 118 (FIG. 1). Therefore, when the user turns their head, the decrypted code is still covered with a black bar within some portion on the lens 120 (FIG. 1) of the AR glasses 118 (FIG. 1). Furthermore, the portion of decrypted code displayed on the lens 120 (FIG. 1) may be based on the user authorization level of the user login credentials. For example, if the user login credentials have a user authorization level four and the encrypted code includes code authorization levels of one through five, then portions of the code having code authorization levels one through four may be decrypted. However, the portions of code with code authorization level five or greater (that the user is not authorized to view) may be covered by a black bar. The black bar may be a visual indicator that the code being covered by the black bar is encrypted. Moreover, the black bar may not be part of the encrypted code and may be covering the encrypted code on the lens 120 (FIG. 1) to improve readability of the code. For example, the user may be confused when switching from viewing encrypted code to viewing decrypted code. A user may then access a portion of the code within a code authorization level and may also edit a portion of the accessed code.

Then, at 212, the decryption program 110*a-c* (FIG. 1) receives user modifications to the code. The modified code may include modification indicators (e.g., font color change, underline, bold, and/or arrows adjacent to the code) to illustrate the location of modifications within the code. The code modifications may result in the code changing code authorization levels by the user and/or the administrator changing the code authorization level. For example, the user may add sensitive material to the code that requires a higher code authorization level. Modified code may also be automatically sent to an authorized administrator, where the administrator may determine the code authorization level. Furthermore, the modified code may also include a note displayed within the IDE and/or the AR glasses 118 (FIG. 1) indicating that the code authorization level changed and the reason why the code authorization level changed.

Next, at 214, the decryption program 110*a-c* (FIG. 1) displays the modified code on the lens 120 (FIG. 1) within the AR glasses 118 (FIG. 1). The displayed code may include the modification indicators showing the location of modifications within the code and the reasons for instituting the modifications. Furthermore, the displayed code may display new black bars on the lens 120 (FIG. 1) covering portions of code that have a higher code authorization level than the user is authorized to see due to the modifications. Moreover, error messages that were recently displayed at step 206 may be updated according to the modifications. For example, the error message may include another administrator to contact in order to be granted privileges to view certain restricted code. In at least one embodiment, the decryption program 110*a-c* (FIG. 1) may remove the black bars based on modifications to the code, for example, when the modifications change the code authorization level to a level the user is authorized to see.

Figure 3:
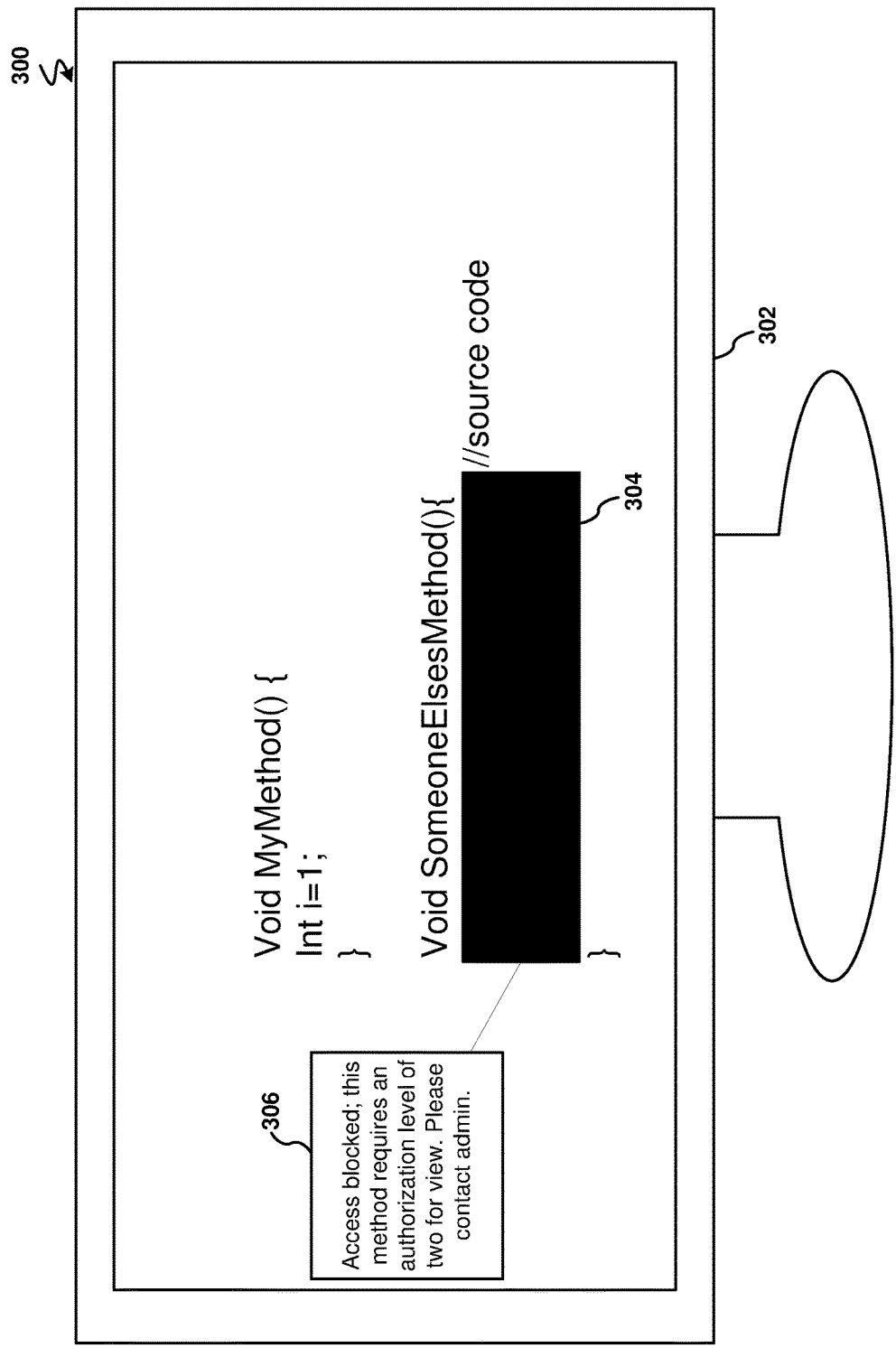
FIG. 3 is a block diagram of an example of a user perspective view while wearing the AR glasses according to at least one embodiment.

FIG. 3 is a block diagram 300 of an example of a user perspective view while wearing the AR glasses 118 (FIG. 1). A monitor 302 (e.g., a monitor of computer 102 (FIG. 1)) may display code that may have been encrypted by an IDE using known encryption methods. The encrypted code displayed may include code of various code authorization levels. The AR glasses 118 (FIG. 1) may decrypt code at a predefined authorization level as described previously at step 210 (FIG. 2). For example, restricted code may require a user authorization level two for a user to view or edit. Furthermore, the AR glasses 118 (FIG. 1) may be designed to decrypt up to a predefined code authorization level one. The portion of code with code authorization level two may have been converted into a black bar 304. An error message 306 may be displayed on the lens 120 (FIG. 1) within the AR glasses 118 (FIG. 1) adjacent to the black bar 304 stating a reason for restricting access to the user as described previously at step 206 (FIG. 2). Furthermore, the error message 306 may include information for how to access the restricted code, such as an administrator capable of changing user authorization levels. Moreover, the text within error message 306 may be customizable according to the user authorization level. Additionally, the error message 306 for a user with a low user authorization level (e.g., level one) may display more explicit information, such as an administrative contact capable of granting access to restricted code, while the error message 306 for a user with a high user authorization level (e.g., level four) may display less information since the more experienced user may already be aware of the procedure. Additionally, user authorization levels may depend on the user's role or position. For example, new hires may be granted a user authorization level one while senior/experienced users may be granted a higher user authorization level.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

According to at least one embodiment, the integrated development environment (IDE) may encrypt code according to a code authorization level. For example, a portion of code with a code authorization level four may be encrypted differently than a portion of code with a code authorization level two. Furthermore, the higher the code authorization level, the higher the complexity of encryption. For example, a portion of code with code authorization level five may require a more complex encryption than a portion of code with code authorization level three. Additionally, the AR glasses 118 (FIG. 1) may be designed to decrypt code in real time up to a predefined code authorization level. For example, a user may utilize a pair of AR glasses 118 (FIG. 1) to decrypt and view code with code authorization level four or lower while code with code authorization level five or higher remains encrypted to the user. If the user wants to view code with code authorization level five, then the user may wear other AR glasses 118 (FIG. 1) that may be configured to decrypt code with code authorization level five or below. Moreover, the AR glasses 118 (FIG. 1) may decrypt code of certain code authorization levels (e.g., code with code authorization level four or level two) or code that may be associated with a certain project. For example, the project may include code with various code authorization levels (e.g., level two, level four, and level six) and the AR glasses 118 (FIG. 1) may only decrypt the various code authorization levels for the certain project. Moreover, the code authorization level may be defined by an administrator. Indicators may be utilized by the AR glasses 118 (FIG. 1) to identify the predefined code authorization levels. Additionally, the code may be tagged with a particular job and the AR glasses 118 (FIG. 1) may authorize a particular user to view that code regardless of the code authorization level.

According to at least one other embodiment, the IDE may be capable of encrypting code independently or utilize code encryption software to encrypt code. The IDE may encrypt code and then place identifiers within the encrypted code indicating the code authorization level for specific portions of code. The AR glasses 118 (FIG. 1) may also be designed to decrypt any code regardless of the code authorization level associated with the code. For example, the AR glasses 118 (FIG. 1) may be designed to decrypt code authorization levels one through ten and the code decrypted by the AR glasses 118 (FIG. 1) may depend on the received user login credentials. Furthermore, the AR glasses 118 (FIG. 1) or the IDE may verify user login credentials to verify which code authorization levels the user may be permitted to view or edit. The AR glasses 118 (FIG. 1) may view encrypted code and may then recognize particular identifiers (e.g., markers within the IDE that may indicate the code authorization level) within the code. The AR glasses 118 (FIG. 1) may then decrypt code according the identifiers within the code being detected by the AR glasses 118 (FIG. 1), if the user's authorization level is verified by user login credentials. If the user login credentials are not verified, then the AR glasses 118 (FIG. 1) may convert the encrypted code into colored bars displayed on the lens 120 (FIG. 1) of the AR glasses 118 (FIG. 1) to represent that decryption may not occur at this time and that the user may need to be granted privileges to access that particular code authorization level. The user may also be prevented from editing that particular portion of code by the IDE since the user's authorization level is insufficient.

According to yet another embodiment, the AR glasses 118 (FIG. 1) may decrypt portions of the code authorization level above the user authorization level but the IDE may restrict the user from editing the code with code authorization level above the user authorization level. For example, if the user has a user authorization level four, the AR glasses 118 (FIG. 1) may decrypt and then display portions of code with code authorization levels above level four, for the user to understand the code more clearly (e.g., when code with code authorization level three depends on code with code authorization level four) but the IDE may restrict the user from editing the code with code authorization level four or above.

According to at least one embodiment, the code authorization level may change when edits are made to the code. Consequently, if the code authorization level exceeds the user authorization level after the code edits, then the user may need to obtain a higher user authorization level. The user can obtain a higher user authorization level from the administrator when a code authorization level has been raised (e.g., due to editing code). Additionally, this can increase the likelihood of quick provisioning of fine-grained access control in the encrypted code and may also provide an audit trail for the administrator to track editing of the code. Metadata or other indicators may be used for providing an audit trail. Furthermore, metadata may be used to specify the start and end of a particular portion of edited code. The user can attach a label to a section of edited code and then users can see the code authorization level for that particular portion of encrypted code. Moreover, changing authorization levels of edited code may enable the AR glasses 118 (FIG. 1) to access an encrypted code that may be necessary for a particular project. Then, the AR glasses 118 (FIG. 1) may transmit a message to the administrator when such edited code has been accessed by the user in order to create an audit trail. Furthermore, when writing code with sections to which the user would like to assign specific code authorization levels, the user may insert a label adjacent to a portion of code using metadata. The metadata may be saved for future use by the decryption program 110*a-c* (FIG. 1). Moreover, when a user is downloading code to review or further develop existing software, the user can agree to accept a default code authorization level set up by the previous user. Additionally, metadata concerning the code authorization level required for a particular portion of code may be retained if a portion of code has been manipulated (e.g., copied and/or pasted), thereby increasing the likelihood that security concerns are in place for the portion of code immediately preceding the download.

Figure 4:
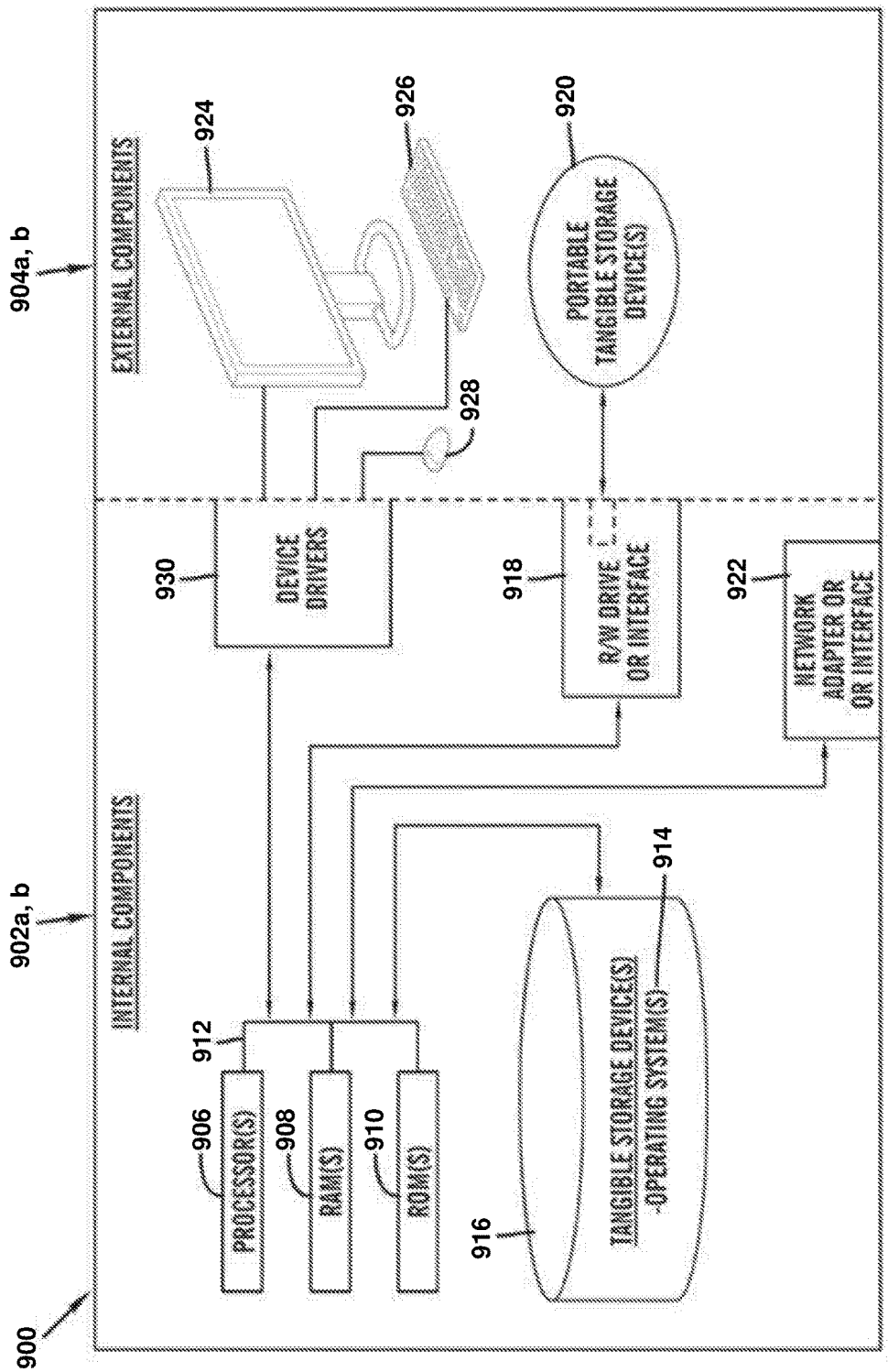
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 *a, b* and external components 904 *a, b* illustrated in FIG. 4. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 (FIG. 1), and the decryption program 110*a* (FIG. 1) in client computer 102 (FIG. 1), the decryption program 110*b* (FIG. 1) in the AR glasses 118 (FIG. 1), and the decryption program 110*c* (FIG. 1) in network server 112 (FIG. 1) may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the decryption program 110*a-c* (FIG. 1) can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the decryption program 110*a* (FIG. 1) in client computer 102 (FIG. 1), the decryption program 110*b* (FIG. 1) in the AR glasses 118 (FIG. 1), and the decryption program 110*c* (FIG. 1) in network server computer 112

(FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the decryption program 110a (FIG. 1) in client computer 102 (FIG. 1), the decryption program 110b (FIG. 1) in the AR glasses 118 (FIG. 1), and the decryption program 110c (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
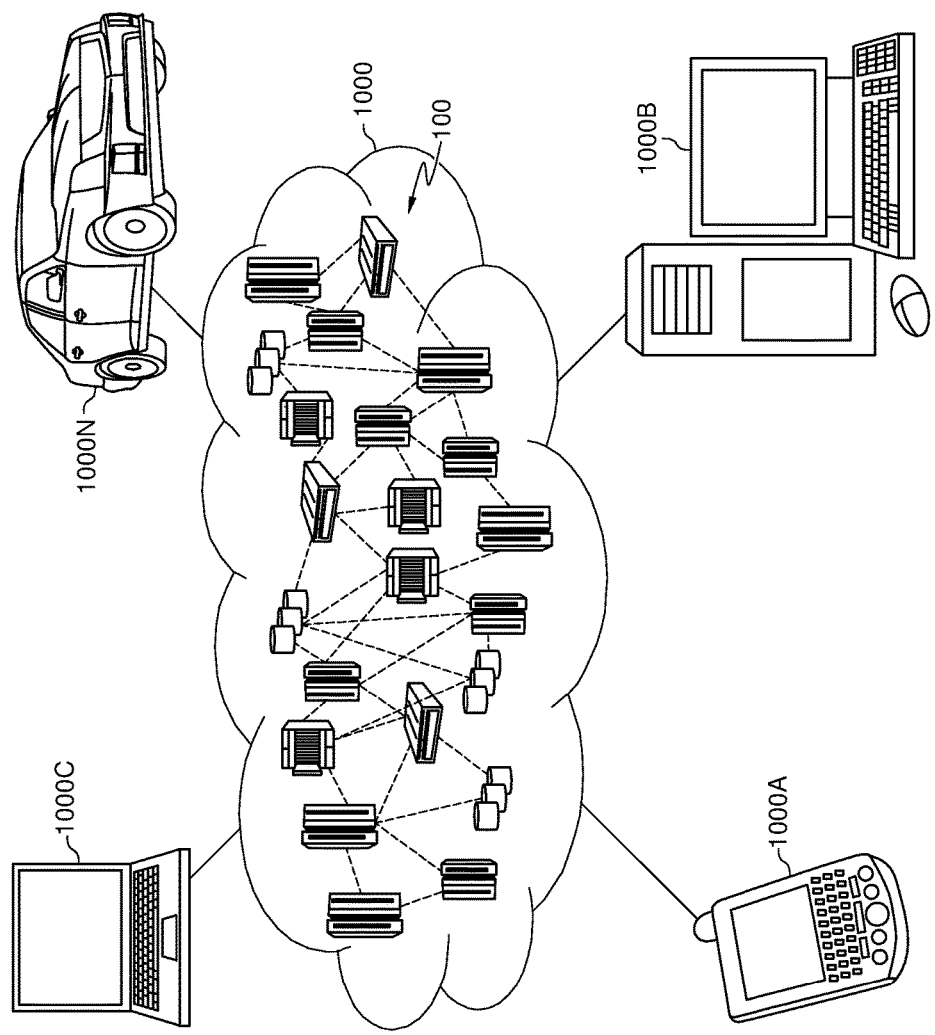
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
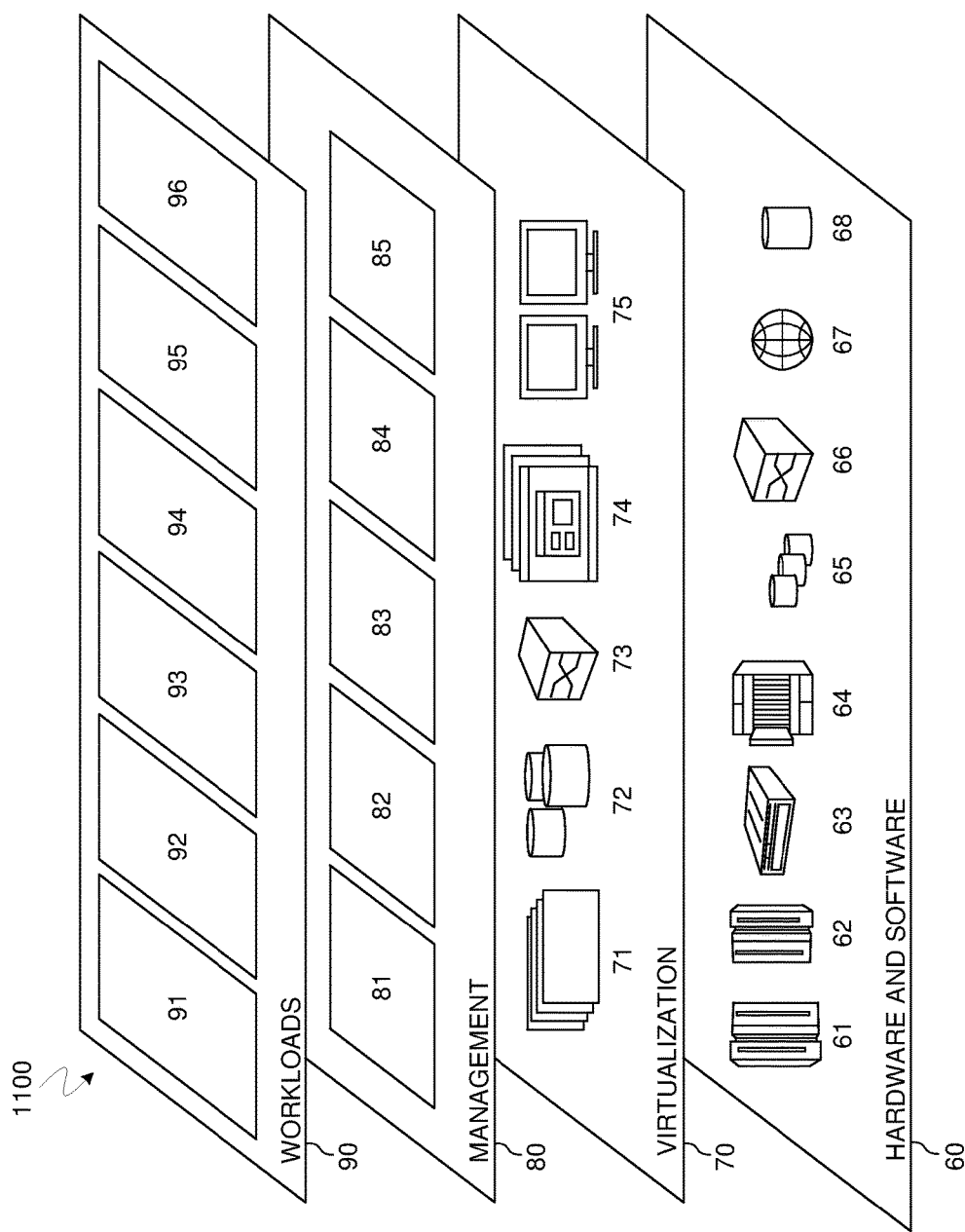
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and decrypting source code 96. Decrypting source code 96 allows a user to view code encrypted by an IDE through AR glasses 118 (FIG. 1). The user may input user login credentials through the AR glasses 118 (FIG. 1) or the IDE for verification by the decryption program 110a-c (FIG. 1). The AR glasses 118 (FIG. 1) may decrypt code according a verification of which authorization level a user may be granted access to view and/or edit, according to the user login credentials.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for viewing a plurality of encrypted code that is grouped into one or more code authorization levels and displayed within an integrated development environment (IDE) with a pair of augmented reality (AR) glasses, and wherein a decrypted portion of the encrypted portion is based on a user authorization level, the method comprising:

receiving, by a processor, a plurality of user login credentials submitted by a user utilizing the pair of AR glasses to access a plurality of encrypted code, wherein the received plurality of user login credentials are a username and password and are associated with an authorization level of code that the user has access to view and edit, wherein the plurality of user login credentials are input to the IDE via voice recognition by the user, and wherein the plurality of encrypted code is stored within a source code repository that includes both source code and proprietary code;

determining, by the IDE searching a database that includes a list of user credentials and a list of associated user authorization levels, the user is authorized to access a portion of the plurality of encrypted code and the user authorization level associated with the user based on the received plurality of user login credentials;

receiving a verification message from the IDE that includes the authorization level associated with the user;

decrypting the portion of the plurality of encrypted code based on receiving the verification message, wherein the decrypted portion authorization level is less than or equal to the authorization level associated with the user, wherein the decrypted portion authorization level is defined by an administrator;

displaying the decrypted portion on a lens within the pair of AR glasses that includes the encrypted portion of code covered by a black bar;

receiving a command to modify the decrypted portion made by the user within the IDE;

modifying the decrypted portion based on the received command;

transmitting the modified decrypted portion to an administrator to determine an authorization level of the modified decrypted portion;

determining, by the administrator, a changed authorization level of the modified decrypted portion;

displaying the modified decrypted portion on the lens within the pair of AR glasses, wherein the modified decrypted portion has an adjusted font color, wherein the modified decrypted portion includes a note displayed on the lens within the pair of AR glasses indicating a reason why the authorization level changed.

* * * * *